May 23, 1933.    E. R. FITCH    1,910,600
PNEUMATIC STEERING DEVICE
Filed Oct. 11, 1928
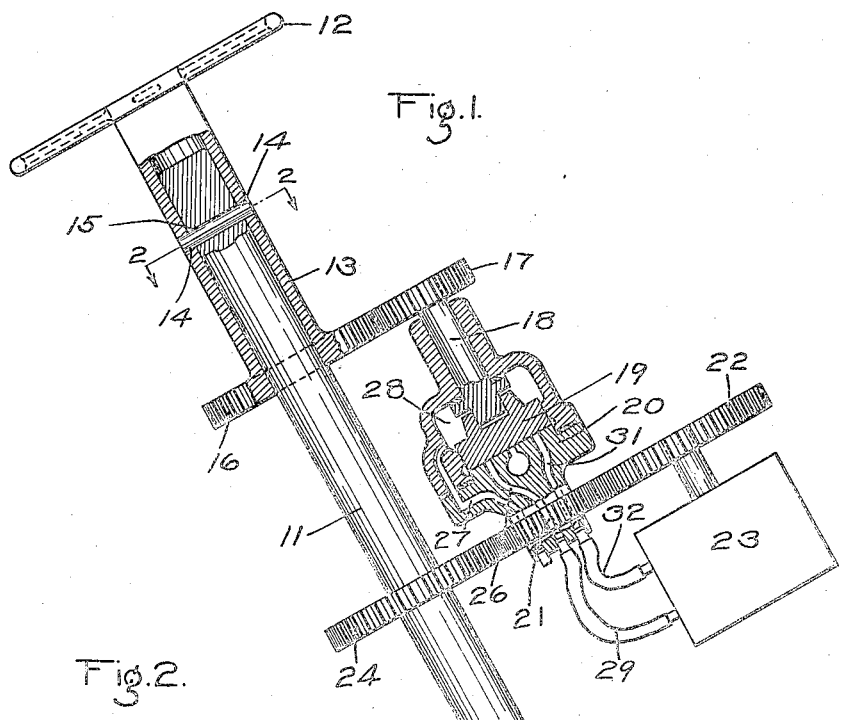
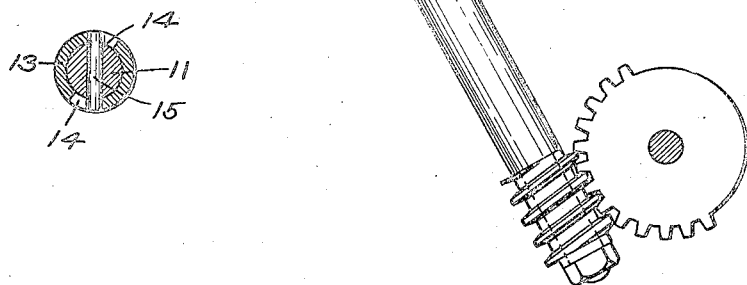
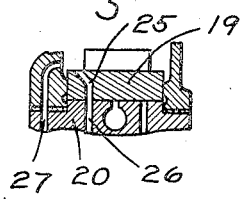 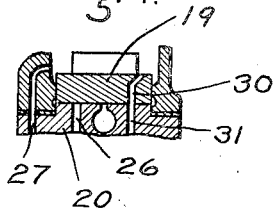
INVENTOR
ELLERY R. FITCH
BY *Wm. M. Cady*
ATTORNEY Patented May 23, 1933

1,910,600

UNITED STATES PATENT OFFICE

ELLERY R. FITCH, OF WESTWOOD, NEW JERSEY, ASSIGNOR TO THE WESTINGHOUSE AIR BRAKE COMPANY, OF WILMERDING, PENNSYLVANIA, A CORPORATION OF PENNSYLVANIA

PNEUMATIC STEERING DEVICE

Application filed October 11, 1928. Serial No. 311,730.

This invention relates to automotive vehicles and more particularly to the steering mechanism therefor.

An object of the invention is to provide a pneumatically operated steering device for automotive vehicles.

Another object of the invention is to provide the steering mechanism of automotive vehicles with pneumatically operable means for facilitating the action of the steering wheel when the same is turned.

Another object of the invention is to provide an automotive steering mechanism of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a diagrammatic view, partly in section, of a pneumatic steering device embodying my invention, showing the same in a neutral position; Fig. 2 is a transverse section taken on the line 2—2 of Fig. 1; Fig. 3 is a detail section of a portion of the rotary valve device showing the parts positioned when the steering wheel is turned toward the right, or in a clockwise direction; and Fig. 4 is a view similar to Fig. 3 showing the parts of the rotary valve device positioned when the steering wheel is turned toward the left, or in a counterclockwise direction.

Referring to the drawing, the main shaft 11 of the steering mechanism carries a steering wheel 12 having a tubular stem or sleeve 13 mounted on the shaft. For the purpose of connecting the steering wheel to the shaft 11, the sleeve 13 is formed with diametrically disposed slotted openings 14 into which project the opposite ends of a pin 15 mounted transversely in the shaft 11. In this way the steering wheel is loosely keyed to the shaft 11, so that a small amount of rotary motion of one will not be transmitted to the other, as will be readily understood.

The sleeve 13 carries a gear 16 which meshes with a gear 17 on the stem 18 of a rotary valve 19 having a seat 20.

The rotary valve seat 20 in turn is provided with a gear 21 which meshes with the gear 22 of a pneumatic engine 23, of any approved type. The gear 21 also meshes with a gear 24 mounted on the shaft 11.

In operation, when the steering wheel is rotated in one direction, say for instance, clockwise, the gear 17 will be revolved by gear 16 to bring port 25 of the rotary valve 19 into communication with passage 26 in the valve seat 20 (See Fig. 3).

With the parts thus positioned, fluid under pressure from a suitable source of supply will be conducted through pipe and passage 27, chamber 28, port 25, passage 26, and pipe 29 to the engine 23, which is, in the present instance, diagrammatically shown.

The engine 23 will now impart a rotary motion to the shaft 11, through gears 22, 21 and 24, at the same rate which the steering wheel 12 is being turned, and therefore the relative position of valve 19 on seat 20 will remain unchanged.

When rotation of the steering wheel 12 is stopped, engine 23 will continue to rotate shaft 11 in view of the loose connection between the shaft 11 and steering wheel heretofore referred to. Whereupon the engine 23 will turn the seat 20 of the rotary valve to lap passage 26 and thereby shut off the supply of fluid to the engine.

When the steering wheel is turned toward the left, gear 17 will be revolved by gear 16 to bring port 30 of the rotary valve 19 into communication with passage 31 in the valve seat 20 (see Fig. 4).

With the parts thus positioned, fluid under pressure which is delivered to chamber 28 through pipe and passage 27, will be conducted through port 30, passage 31 and pipe 32 to the side of the engine 23 opposite to the side having the pipe 29.

In this way the engine will be operated in a direction opposite to that first described to rotate the shaft 11, such operation continuing while the steering wheel 12 is being turned and being halted shortly after the movement of the wheel is stopped as has been heretofore described. Whereupon the port 30 will be lapped by the seat 20 thereby shutting off the supply of fluid.

While one illustrative embodiment of the invention has been described in detail, it is not my intention to limit its scope to that embodiment or otherwise than by the terms of the appended claim.

Having now described my invention, what I claim as new and desire to secure by Letters Patent, is:—

A vehicle steering mechanism comprising a steering shaft, a steering wheel having a sleeve mounted on said shaft and movable relatively to said shaft, a fluid pressure operated engine for rotating said shaft, a valve device for controlling the fluid pressure for operating said engine comprising relatively movable valve members, a gear carried by said sleeve, a gear meshing with said sleeve gear for operating one of said valve members, a gear carried by said shaft, a gear operated by said engine, and a gear for operating the other valve member, said last mentioned gear meshing with the engine operated gear and the shaft gear, whereby the gear for operating said other valve member serves as a gear to transmit motion from said engine to said shaft.

In testimony whereof I have hereunto set my hand, this first day of Oct., 1928.

ELLERY R. FITCH.